US006031027A

United States Patent [19]

Syre et al.

[11] Patent Number: 6,031,027

[45] Date of Patent: Feb. 29, 2000

[54] METHOD OF COMPOUNDING A MULTIMODAL POLYMER COMPOSITION

[75] Inventors: Arne Syre, Stathelle, Norway; Carl-Gustaf Ek, Västra Frölunda, Sweden; Aimo Sahila, Kerava, Finland; Svein Eggen, Eidanger; Rune Nygaard, Stathelle, both of Norway; Ilka Vaara, Porvoo, Finland; Kristen Kjeldsen, Eidanger, Norway

[73] Assignee: Borealis Polymers OY, Porvoo, Finland

[21] Appl. No.: 09/285,167

[22] Filed: Mar. 26, 1999

Related U.S. Application Data

[63] Continuation of application No. PCT/SE97/01659, Oct. 3, 1997.

[30] Foreign Application Priority Data

Oct. 9, 1996 [SE] Sweden .................................. 9603683

[51] Int. Cl.$^{7}$ ............................ B29C 47/76; B29C 47/78

[52] U.S. Cl. .................. 523/344; 264/176.1; 264/177.13

[58] Field of Search ......................... 523/344; 264/176.1, 264/177.13

[56] References Cited

U.S. PATENT DOCUMENTS

| 3,392,962 | 7/1968 | Fritsch et al. | 259/9 |
|---|---|---|---|
| 5,409,646 | 4/1995 | Menon et al. | 264/28 |
| 5,773,155 | 6/1998 | Kale et al. | 428/523 |

FOREIGN PATENT DOCUMENTS

| 0 022 376 | 1/1981 | European Pat. Off. . |
|---|---|---|
| 0 040 992 | 12/1981 | European Pat. Off. . |
| 0 041 796 | 12/1981 | European Pat. Off. . |
| 0 588 147 A1 | 3/1994 | European Pat. Off. . |
| 0 645 232 A1 | 3/1995 | European Pat. Off. . |
| WO 92/12182 | 7/1992 | WIPO . |

OTHER PUBLICATIONS

File WPI, Derwent accession No. 94–307394, Mitsubishi Kasei Corp: “Polyethylene type resin coated paper prodn.; useful for container—by melt extruding a polyethylene resin on a paper base using an extruder at screw rotation number higher than critical rotation number” & JP, A, 6234170, 940823, DW9438.

*Primary Examiner*—Kriellion Sanders
*Attorney, Agent, or Firm*—Merchant & Gould P.C.

[57] ABSTRACT

A method of compounding a multimodal, preferably a bimodal polymer composition comprising a low molecular weight ethylene polymer and a high molecular weight ethylene polymer is described. The composition is compounded during a relatively long time at a low temperature which lies in a narrow temperature range including the melting point of the low molecular weight ethylene polymer. More particularly, the polymer composition is compounded, without addition of a beat transfer medium, in a temperature range from about 10° C. below to about 10° C. above the melting point of the low molecular weight ethylene polymer during a time of more than 10 seconds. The viscosity ratio between the ethylene polymers in said temperature range preferably is from about 5:1 to about 1:5.

10 Claims, No Drawings

METHOD OF COMPOUNDING A MULTIMODAL POLYMER COMPOSITION

This application is a Continuation of International Application Ser. No. PCT/SE97/01659, filed Oct. 3, 1997.

The present invention relates to the compounding of polymer compositions and more particularly to a method of compounding a multimodal polymer composition comprising a low molecular weight ethylene polymer and a high molecular weight ethylene polymer.

For the purpose of the present invention the expression "ethylene polymer" comprises ethylene homopolymers and ethylene copolymers.

Further, for the purpose of the present invention the molecular weight of the polymer is defined by way of its melt flow rate (MFR) according to ISO 1133. The melt flow rate (which is often erroneously referred to as the melt index) is measured in g/10 min of the polymer discharge under specified temperature, pressure and die conditions and is a measure of the viscosity of the polymer, which in turn for each type of polymer is mainly influenced by its molecular weight distribution, but also by its degree of branching etc. For a specific type of polymer the higher the value of its MFR, the lower its mean molecular weight.

Thus, the expression "a low molecular weight ethylene polymer" means an ethylene polymer with a high melt flow rate (MFR) of $MFR_{2.16}$=about 0.1–5000 g/10 min, determined according to ISO 1133, condition 4.

Similarly, the expression "a high molecular weight ethylene polymer" means an ethylene polymer with a low melt flow rate of $MFR_{21.6}$=about 0.01–10.0 g/10 min, determined according to ISO 1133, condition 7.

When producing a polymer composition the ingredients thereof, such as different polymers, fillers, additives, etc, should be mixed intimately in order to obtain as homogenous a composition as possible. This intimate mixing is done by compounding the ingredients in a compounding machine, continuous or batchwise; the former type can be exemplified by an extruder which may be of the single screw of double screw type. When the composition comprises two or more different polymers these should be so thoroughly mixed with each other that, ideally they form a completely homogenous polymer blend. To achieve this the polymers are mixed with or without external heating so that they are melted and converted into liquids and the liquid polymers are mixed at sufficiently high shear rates.

While on the one hand the compounding should be carried out at a) a high temperature to transform the polymer components to low viscosity liquids which makes for easier mixing, b) the highest possible shear rate to supply a large amount of mixing energy, and c) during as long time as possible, in order to achieve a homogenous composition, it is on the other hand necessary to restrict the temperature, shear rate and time because of the degradation of the polymers that is caused by too severe conditions.

In order to strike a balance between good compounding conditions and low degradation of the polymers the composition is normally compounded by letting the temperature rise as quickly as possible above the melting points of the polymer components and subjecting it to a high shear rate for as short time as possible. Normally, this means compounding the composition in an extruder by heating the composition under conditions such that the rising temperature of the melting ethylene polymer passes the temperature range 130–160° C. in well below 10 seconds.

Although the above described conventional way of compounding polymer compositions in many instances leads to acceptable results, problems are encountered when compounding multimodal polymer compositions, and more particularly multimodal polymer compositions comprising a low molecular weight ethylene polymer and a high molecular weight ethylene polymer. Thus, when compounding polymer compositions, e.g. for pipes, so called "white spots" occur in the compounded material. These white spots have a size of about 10–50 $\mu$m and consist of high molecular weight polymer particles that have not been adequately compounded in the composition. In addition to being disfiguring the white spots may adversely influence the strength of the composition. Further, when compounding polymer compositions, e.g. for the production of film, gel particles with a size of about 0.01–1 mm often occur. These gel particles appear as disfiguring inhomogeneities in the finished film and consist of high molecular weight polymer particles that have not been adequately compounded in the composition.

The above described white spots and gel particles are a serious problem in the polymer industry and a solution to the problem would mean the removal of an obstacle to use otherwise superior multimodal polymer compositions.

In EP 645 232 is described a way of reducing or obviating this problem by adding into the polymer feed a heat transfer medium, like liquid nitrogen or liquid or solid carbon dioxide. The amount of heat transfer medium added ranges from about 5% to 30%, preferably from about 10% to 20% by weight based upon the total feed rate of the polymer. Such an addition of a heat transfer medium is, however, a relatively costly way and, in the case of the use of solid carbon dioxide, which is the preferred means, it also presents problems with the working environment.

It has now surprisingly been found that it is possible to alleviate or eliminate the above problem by carrying out the compounding in a new way, and more particularly by compounding the multimodal polymer composition for a longer time at a relatively low melt temperature, said temperature lying in a narrow temperature range within which most of the melting of the polymer components actually takes place.

Thus, the present invention provides a method of compounding, in a single or double screw extruder, at shear rates of at most 100 $s^{-1}$ in the zone where the major compounding work is performed, of a multimodal polymer composition, comprising a low molecular weight ethylene polymer and a high molecular weight ethylene polymer, without leaving "white spots" or gel particles in the final blend. According to the method of the present invention, no heat transfer medium is added to the polymer composition and further the residence time in the zone where the temperature in the melt rises from 10° C. below to 10° C. above the melting point of the low molecular weight ethylene polymer is longer than 10 seconds, preferably longer than 15 seconds, more preferably longer than 20 seconds and most preferably longer than 25 seconds. Under these conditions the lower melting, high molecular weight ethylene polymer component will first get melted and compounded before the higher melting, low molecular weight component starts to melt, so that the major compounding work will be directed towards the lower melting, high molecular weight, ethylene polymer component.

These and other advantages and characterising features of the present invention will appear from the following specification and the appended claims.

As mentioned earlier, the polymer composition compounded according to the present invention is a multimodal, preferably a bimodal polymer composition. With regard to the "modality" of a polymer, this expression refers to the form of its molecular weight distribution curve, i.e. the appearance of the graph of the polymer weight fraction as function of its molecular weight. If the polymer is produced in a sequential step process, utilising reactors coupled in series and using different conditions in each reactor, the different fractions produced in the different reactors will each have their own molecular weight distribution. When the molecular weight distribution curves from these fractions are superimposed into the molecular weight distribution curve for the total resulting polymer product, that curve will show two or more maxima or at least be distinctly broadened in comparison with the curves for the individual fractions. Such a polymer product, produced in two or more serial steps, is called bimodal or multimodal depending on the number of steps. In the following all polymers thus produced in two or more sequential steps are called "multimodal". It is to be noted here that also the chemical compositions of the different fractions may be different. Thus one or more fractions may consist of an ethylene copolymer, while one or more others may consist of ethylene homopolymer.

It is previously known to produce multimodal, in particular bimodal, olefin polymers, preferably multimodal ethylene polymers, in two or more polymerisation reactors connected in series. As instances of this prior art, mention may be made of EP 040 992, EP 041 796, EP 022 376 and WO 92/12182, which are hereby incorporated by way of reference as regards the production of multimodal polymers. According to these references, each and every one of the polymerisation stages can be carried out in liquid phase, slurry or gas phase. It is particularly preferred that the polymer composition to be compounded according to the present invention is the product of such polymerisation in two or more reactors connected in series.

However, the multimodal polymer composition may alternatively comprise at least two different and initially separate ethylene polymer components which are made into a multimodal composition by melt blending or compounding in accordance with the present invention.

Further, the present invention is restricted to the compounding of a multimodal polymer composition comprising a low molecular weight ethylene polymer and a high molecular weight ethylene polymer. As mentioned earlier, in connection with the present invention the molecular weight of the polymer is defined by way of its melt flow rate. Generally, the low molecular weight ethylene polymer has a $MFR_{2.16}$ of about 0.1–5000 g/10 min, preferably about 50–500 g/10 min, and the high molecular weight ethylene polymer has a $MFR_{21.6}$ of about 0.01–10.0 g/10 min, preferably about 0.1–5.0 g/10 min.

Another distinguishing quality of the ethylene polymer components are their densities which should lie within certain ranges. The density of the low molecular weight ethylene polymer should lie in the range from about 0.935–0.970, preferably from about 0.940–0.965 g/cm$^3$, while the density of the high molecular weight ethylene polymer should lie in the range from about 0.875–0.945, preferably from about 0.875–0.935 g/cm$^3$. Thus, preferably, the low molecular weight ethylene polymer is a high density type polyethylene (HDPE) and the high molecular weight ethylene polymer is a linear low density type polyethylene (LLDPE).

As mentioned above, at the present invention the polymer composition is subjected to compounding for an extended period of time in a temperature range from about 10° C. below to about 10° C. above, preferably from about 5° C. below to about 5° C. above the melting point of the low molecular weight ethylene polymer. This temperature range, under the conditions used in the extruder, will cover the range from where the high molecular, low melting, ethylene polymer component has started significantly to melt until also a major part of the low molecular, higher melting, ethylene polymer component has melted and been worked into the blend.

In the zone of the extruder where the major compounding takes place, the viscosity of the low molecular weight ethylene polymer to the viscosity of the high molecular weight ethylene polymer should preferably lie within the range from about 5:1 to about 1:5, more preferably from about 3:1 to about 1:3. It has been found that it becomes increasingly difficult to achieve a good distribution and dispersion of the polymer components if the viscosity ratio lies outside this range.

It is believed that when compounding a multimodal polymer composition in accordance with the present invention within the above mentioned temperature range, at first both the low molecular weight ethylene polymer and the high molecular weight ethylene polymer are present as solids. At this stage the high molecular weight polymer component presents less resistance to deformation, since it is less crystalline and lower melting than the other component. It will therefore take up the major part of the shear forces and start to melt. When the temperature then rises, the higher melting, low molecular weight component will gradually start to melt and get worked into the matrix of the already melted, high molecular weight component. Once melted, the low molecular weight component will of course have the lower viscosity. As noted above, during this procedure, the viscosity ratio should amount to at most about 5:1, i.e. the viscosities of the polymer components should not differ too much in order to obtain a good dispersion of the components. The closer the two materials are in viscosity, the more easily forces will be transferred from one phase to the other resulting in deformation/dispersion and thus good mixing.

During the compounding the high molecular weight ethylene polymer which has the lower melting point thus starts at first to melt while the low molecular remains solid. At this stage the viscosity difference between the two polymer components becomes inverted in that the viscosity of the high molecular weight ethylene polymer, from under normal conditions being higher than that of the low molecular weight ethylene polymer suddenly drops when the high molecular weight ethylene polymer melts and becomes lower than that of the low molecular weight, still solid ethylene polymer. This "inverted" viscosity relation remains until the low molecular weight ethylene polymer component has melted, because in liquid phase and at the same temperature the high molecular weight ethylene polymer has a higher viscosity than the low molecular weight ethylene polymer. Therefore, as the temperature rises the difference in viscosity between the polymer components gets reversed back into normal when both polymer components are completely melted.

In the crossover area where the polymer components transform from solid to liquid phase the two materials are relatively close in stiffness/viscosity and thus a good mixing and homogeneity can be obtained. In order to optimise the mixing and accordingly the homogeneity of the composition the-compounding should be carried out for as long time as possible in the crossover area, i.e. from a temperature in the melt of about 10° C. below to about 10° C. above the melting point of the low molecular weight ethylene polymer.

According to the invention the time of compounding in the crossover area is longer than 10 seconds, preferably longer than 15 seconds, more preferably longer than 20 seconds and most preferably longer than 25 seconds. However, the time in the crossover area should not be more than about 1 minute. This is in contrast to conventional compounding which normally strives to melt the composition as quickly and completely as possible and compound it as a liquid at a high temperature.

For ethylene polymers of the kind described above the melting points lie at about 125–140° C. However, the temperature at which the melting starts is dependent on the rate of heating and at high rates of heating, such as about 300–400° C./min which may occur during compounding a polymer composition in an extruder, the temperature at which the melting starts may increase to about 140–155° C. Also, the melting of the high molecular weight ethylene polymer is delayed more than that of the low molecular weight ethylene polymer. This means that in practice the crossover area or temperature range within which the compounding according to the invention is carried out roughly lies between 125–155° C. depending on the polymers and on the heating rate.

Another factor of importance is the shear rate to which the polymer composition is subjected during the compounding. Although in principle a more effective mixing should be obtained by increasing the shear rate, a too high shear rate leads to degradation of the polymer. At the present invention the shear rate, in the zone where the major compounding work is performed, should therefore be at most about 100 $s^{-1}$, preferably about 10–100 $s^{-1}$. A shear rate below about 10 $s^{-1}$ tends to be ineffective, while shear rates above about 100 $s^{-1}$ involve a risk of degrading the polymer. With regard to the shear rate the expression "in the zone where the major compounding work is performed" takes into account that during the compounding in an extruder different parts of the polymer composition are exposed to different shear rates. Thus, while a minor part of the composition that passes across the helical screw lands is subjected to high shear rates, the major part of the composition is compounded in the helical screw channel between the screw lands at a lower shear rate. It is this shear rate, which could also be said to be the average shear rate, that should be at most about 100 $s^{-1}$ at the present invention.

The method according to the present invention may in principle be carried out in a conventional compounding apparatus, e.g. of the single screw or double screw type, preferably of the counter rotating double screw type. However, additional cooling may be necessary in order to keep the composition at the prescribed temperature range during the prescribed compounding time.

When the polymer composition has been compounded according to the present invention it may, when required be further compounded according to conventional compounding techniques. This means that the composition may be subjected to an additional compounding step at an increased temperature of about 150–300° C., preferably about 160–250° C. and a shear rate of about 200–1000 $s^{-1}$. This optional, supplementary compounding may be carried out in direct connection with the compounding according to the invention or separately at a later time.

Although it is preferred to carry out the compounding according to the invention in a one-step operation it is also a possibility to let the polymer mixing take place in two or more separate steps by letting the polymer pass through the viscosity crossover stage two or more times, i.e. each step implies a separate compounding operation in a mixer or extruder.

We claim:

1. A method of compounding, in a single or double screw extruder, a multimodal polymer composition comprising a low molecular weight ethylene polymer and a high molecular weight ethylene polymer, characterised in that no heat transfer medium is added to the polymer composition; that the polymer composition is compounded at an average shear rate of at most about 100 $s^{-1}$; and that the residence time in the zone where the temperature of the polymer composition rises from about 10° C. below to about 10° C. above the melting point of the low molecular weight ethylene polymer is more than 10 seconds.

2. A method according to claim 1, wherein the residence time in the zone where the temperature of the polymer composition rises from about 5° C. below to about 5° C. above the melting point of the low molecular weight ethylene polymer is more than 10 seconds.

3. A method according to claim 1, wherein the residence time is more than 15 seconds.

4. A method according to claim 1, wherein the residence time is more than 20 seconds.

5. A method according to claim 1, wherein the ratio of the viscosity of the low molecular weight ethylene polymer to the viscosity of the high molecular weight ethylene polymer in the temperature range from about 10° C. below to about 10° C. above the melting point of the low molecular weight polyethylene polymer lies in the range from about 5:1 to about 1:5.

6. A method according to claim 5, wherein the viscosity ratio lies in the range from about 3:1 to about 1:3.

7. A method according to claim 1, wherein the low molecular weight ethylene polymer has a density of about 0.935–0.970 $g/cm^3$.

8. A method according to claim 1, wherein the high molecular weight ethylene polymer has a density of about 0.875–0.945 $cm^3/g$.

9. A method according to claim 1, wherein the polymer composition is a bimodal polyethylene composition.

10. A method according to claim 6, wherein the composition is compounded in a counter-rotating double-screw extruder.

* * * * *